UNITED STATES PATENT OFFICE.

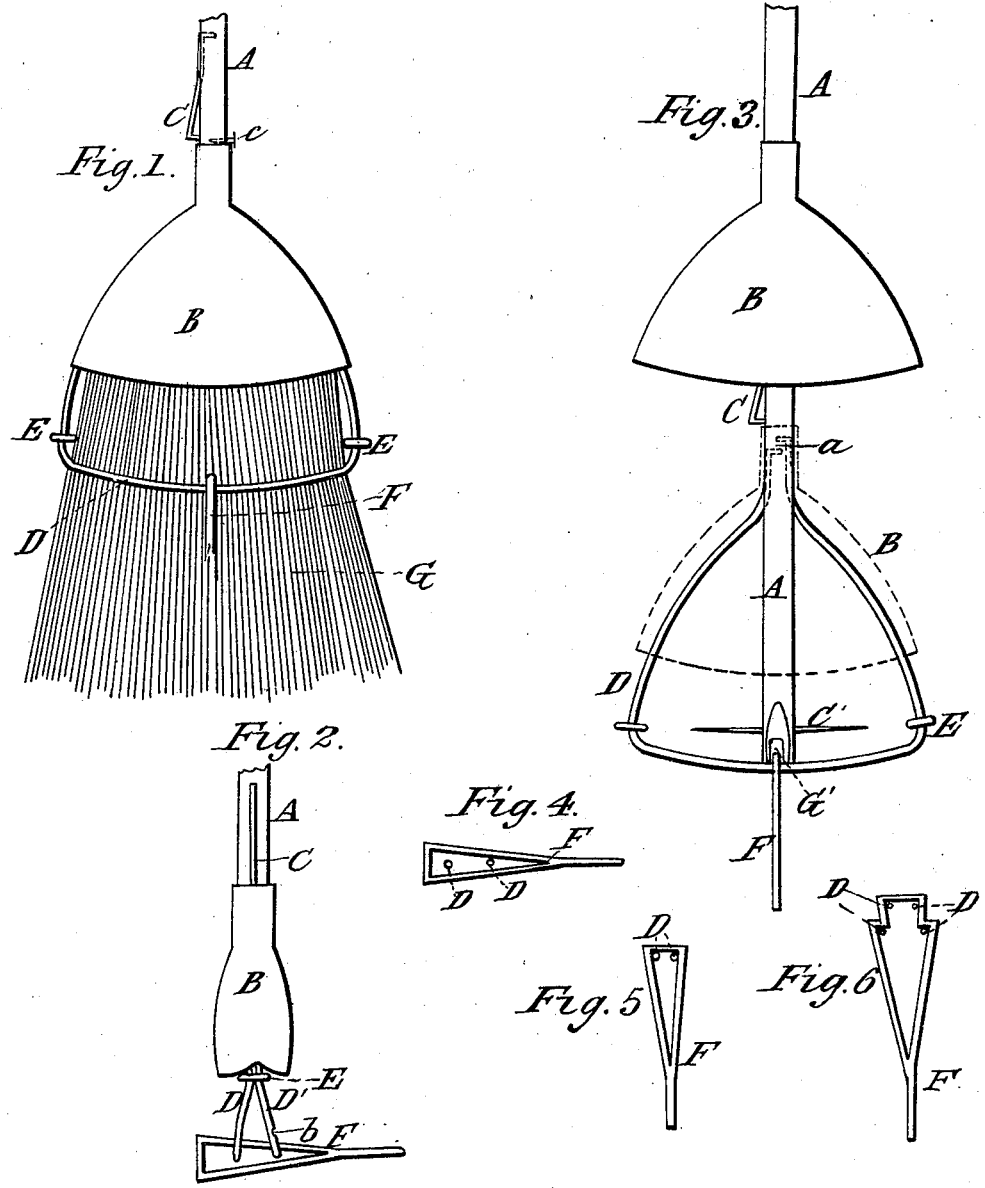

DANIEL P. FARNHAM, OF ROCK COUNTY, WISCONSIN, ASSIGNOR TO HIMSELF AND MOSES P. FARNHAM, OF SAME PLACE.

IMPROVED BROOM.

Specification forming part of Letters Patent No. 54,249, dated April 24, 1866.

*To all whom it may concern:*

Be it known that I, DANIEL P. FARNHAM, of Rock county and State of Wisconsin, have invented a new and useful Improvement in Constructing Brooms; and I do declare that the following is a clear, full, and exact description thereof, reference being had to the accompanying drawings and the letters of reference marked thereon, the same letters of reference denoting the same part in each figure.

My invention relates to that class of brooms wherein the broom-corn or brush material of which the broom is made is attached to a broom-head by means of adjustable metallic frame-work or mechanism, so that when the brush material is worn out a new brush may be supplied as needed, the same handle and mechanism being retained; and it also relates to the arranging and securing the brush to the handle by means of the mechanism, that only about one-half of the brush usually found necessary for a broom need to be used; and it consists, first, in elastic jaws of wire, or suitably elastic material, the ends of which are attached to the broom-handle by means of a socket, which socket also retains in place the upper or butt ends of the broom-corn or other brush material; second, in a spring-catch or its equivalent attached to the handle to hold, in combination with the handle, the socket in place, and when pressed into a groove in the handle the socket may be removed and the parts of the broom separated, whereby a broom is made without twine, nail, screw, or bolt; third, a hollow or looped lever to compress the elastic jaws of the frame-work to hold in place the brush material of the broom; and, fourth, auxiliary rings to aid in holding the jaws in place on the brush material In the accompanying drawings, Figure 1 is a view of a broom and part of a broom-handle, with a socket, jaws, and spring-catch to hold the socket to its place and elastic jaws to hold the brush. Fig. 2 is a view at right angle with Fig. 1, with the brush omitted and the elastic jaws expanded to receive the brush. Fig. 3 is a view of a socket moved upon the handle, showing the jaws, loop-lever, and rings to hold the jaws, also a mode of fastening the ends of the wire of which the jaws are made to the handle, also a spring-catch to hold the socket in place. Figs. 4, 5, and 6, are different views of a loop-lever with the jaws opened and closed.

A in Figs. 1, 2, and 3 is the lower end of the broom-handle, and B is the socket, the upper portion which fits the handle, while the lower portion expands into a kind of flattened inverted-tunnel shape to receive the butts of the broom-corn or material G of which the broom is made. Inside the socket are the upper ends of the wire jaws D and D', and are attached to the handle by a short bend or claw inserted in the handle, as at *a* in Fig. 3, or in any suitable manner, and are confined to the handle by the upper end of the socket covering and inclosing them, while the lower portions extend downward inside the socket at its largest breadth, and also extend below the socket, and by their elasticity expand outward, as D and D', (seen in Figs. 2 and 4,) to receive the broom-corn or brush material, which when inserted between the jaws and in the socket, the jaws are closed by turning to a perpendicular position lever F, as shown in Figs. 1, 3, 5, and 6. The rings E and E, being auxiliary to aid (should the wire the jaws are made of be light) the looped lever in holding the jaws firmly on the brush, are moved downward to the corners of the jaws, thus compressing the jaws and holding the brush fast.

It will be observed that when the auxiliary rings are moved to their place a slight nick or notch, *b*, on one of the jaws secures the ring sufficiently to hold it in its place, and also prevents it from being moved upward by the spring of the jaws or by accident.

The handle A may be made to extend downward and below the socket, as shown by dotted lines and seen in Fig. 3, and has near its end a pin, C', to aid in holding the brush steadily in place, and also a notch, G', in which the looped lever F can be freely moved in opening and closing the jaws. Although this extension of the handle below the socket is not absolutely necessary, yet it serves to give great lateral strength to the broom.

Now, it is obvious that by pressing the spring C into its groove even with the surface of the handle, or removing a pin or nail, *c*, that may be used to keep the socket on its place, the socket may be slipped upward on the handle, as seen in Fig. 5, and the ends of the jaws with the claws removed from their places in the handle, and the whole are separated. This I deem important, as new rings and looped lever may be supplied in place of defective ones by simply separating the parts and putting them together again. Thus, by means of the looped levers or lever and auxiliary rings, the jaws may be opened to remove worn-out brush and receive a supply of new brush, or by removing the socket, as described, the parts may all be separated, and the parts may be put together again or new brush made to supply that which is worn out, and all held firmly without the aid of screw, nail, or bolt, or the necessity of the use of any tools whatever in separating the parts and in putting them together again.

It will be observed that lever F in Fig. 6 is so formed that the jaws D and D' may be held so as to receive a large or small amount of brush, the upper end of the lever being narrow, so as to compress the jaws on a small amount of brush, which is valuable when brush is scarce or when a very light broom is required.

What I claim as my invention, and desire to secure by Letters Patent, is—

Elastic wire jaws D and D' attached to the handle, substantially as described, and operated by a looped lever, F, and auxiliary rings E and E, in combination with socket B, handle A, and spring-catch C, or its equivalent, when the whole are constructed, arranged, and used, substantially as and for the purposes described.

DANIEL P. FARNHAM.

Witnesses:
J. M. MAY,
ED. FRANK.